(12) United States Patent
Mahawadiwar

(10) Patent No.: US 7,487,220 B1
(45) Date of Patent: Feb. 3, 2009

(54) DELIVERING INSTANT MESSAGES TO THE INTENDED USER

(75) Inventor: Nitin M. Mahawadiwar, Chandrapur (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/049,331

(22) Filed: Mar. 15, 2008

(51) Int. Cl.
  *G06F 15/16* (2006.01)
  *G06F 3/048* (2006.01)

(52) U.S. Cl. ............ 709/206; 709/219; 709/227; 715/753; 715/758

(58) Field of Classification Search ......... 709/204–207, 709/217–219, 227–229; 715/751, 753, 758
See application file for complete search history.

(56) References Cited

U.S. PATENT DOCUMENTS

| | | | |
|---|---|---|---|
| 2004/0205775 A1* | 10/2004 | Heikes et al. | 719/318 |
| 2005/0027839 A1 | 2/2005 | Day et al. | |
| 2005/0080868 A1 | 4/2005 | Malik | |
| 2005/0210394 A1* | 9/2005 | Crandall et al. | 715/752 |
| 2006/0048061 A1 | 3/2006 | Forlenza et al. | |
| 2007/0143417 A1 | 6/2007 | Daigle | |
| 2007/0174405 A1 | 7/2007 | Chen et al. | |
| 2007/0180028 A1* | 8/2007 | Chen et al. | 709/204 |
| 2007/0224978 A1 | 9/2007 | Wherry et al. | |
| 2008/0037722 A1* | 2/2008 | Klassen | 379/88.12 |

\* cited by examiner

*Primary Examiner*—Joseph E Avellino
(74) *Attorney, Agent, or Firm*—MaxvalueIP, LLC

(57) ABSTRACT

One example of this invention is about ensuring all messages be delivered to the intended users in any Instant Messaging applications (Server/Client). In one embodiment, the solution requires making improvements at both Server and Client sides, to ensure correct delivery of the message. Various parameters, such as time stamp and wait time, are discussed.

1 Claim, 2 Drawing Sheets

DELIVERING INSTANT MESSAGES TO THE INTENDED USER

BACKGROUND OF THE INVENTION

Instant Messaging (IM) allows instantaneous communication between number of parties simultaneously, by transmitting information quickly and efficiently, featuring immediate receipt of acknowledgement or reply. In certain cases, Instant Messaging involves additional features, which make it even more popular, i.e. to see the other party, e.g. by using webcams, or to talk directly for free over the Internet.

It is possible to save a conversation for later reference. Instant messages are typically logged in a local message history which closes the gap to the persistent nature of e-mails and facilitates quick exchange of information like URLs (Universal Resource Locator) or document snippets (which can be unwieldy when communicated via telephone).

Let's assume that user A and user B are the two users in any Instant Messaging application (Buddies). Most of the Instant Messaging applications display status in the chat window if other user is typing a message. This is good enough only if the message window at the other side is opened. The problem is when user A wants to send a message to user B for the first time. User A opens a chat window for user B and starts typing a message. (Note that, the message is not sent yet.) If at the same time, user B wants to logoff or disconnect from the instant message server, then user B may lose any message from user A (e.g., user A could be a friend, a manager, or a client). In this case, user B never gets notified that user A is typing a message or about what user A is typing.

User B will get a message only if the chat window with user A is opened. If the chat session is not started yet, then in that case, the user B may lose any message from user A. The existing solution only allows user B get a status that "user A is typing a message" if the chat session has already started between user A and user B.

In an organization with thousands of employees, the chances of many people experience losing messages on a daily basis based on this scenario is appreciable.

The present invention, as an example, proposes a solution to address this problem for when the chat session has not yet started, so that all messages will be delivered to the intended recipient.

SUMMARY OF THE INVENTION

An embodiment of this invention provides features to ensure all messages be delivered to the intended users in any Instant Messaging applications (Server/Client). The solution may involve making improvements at both Server and Client sides, to ensure correct delivery of the message. Various parameters, such as time stamp and wait time, are discussed.

DETAILED DESCRIPTION OF THE PREFERRED EMBODIMENTS

In an embodiment of the invention, whenever user A wants to initiates a message session with user B by opening the chat window and typing the message, at the same time, a new record will be created at the server. The lifetime of this record is only until the user A types this first message for user B.

In one embodiment, the table name which holds the information about all users who are typing the first message for other users but not sent yet is called Incomplete Session. This means that the record will be created as soon as the chat window is opened for the first time. The record will be deleted as soon as either user A sends the message or closes the chat window. At the other end with user B, Logoff/Disconnect procedure will be a two-step procedure. Step 1 would just query the above mentioned Incomplete Session table at the server to see if any user is trying to send a message to user B. If the query finds any such record in the table, this indicates that someone is trying to send a message to user B. In this case, before actually logging off the user from the server, an Alert message will be displayed at the user B's client (to whom user A is trying to send the message). Once the alert is displayed at the user B's client, it will be up to user B to wait until the message arrives at user B's client.

Example of an alert to user B is: "User A is trying to send a message for you. Do you still want to disconnect?" If the query does not find any such record associated with user B, then user B can logoff, without getting prompted with an alert.

Figure 1:
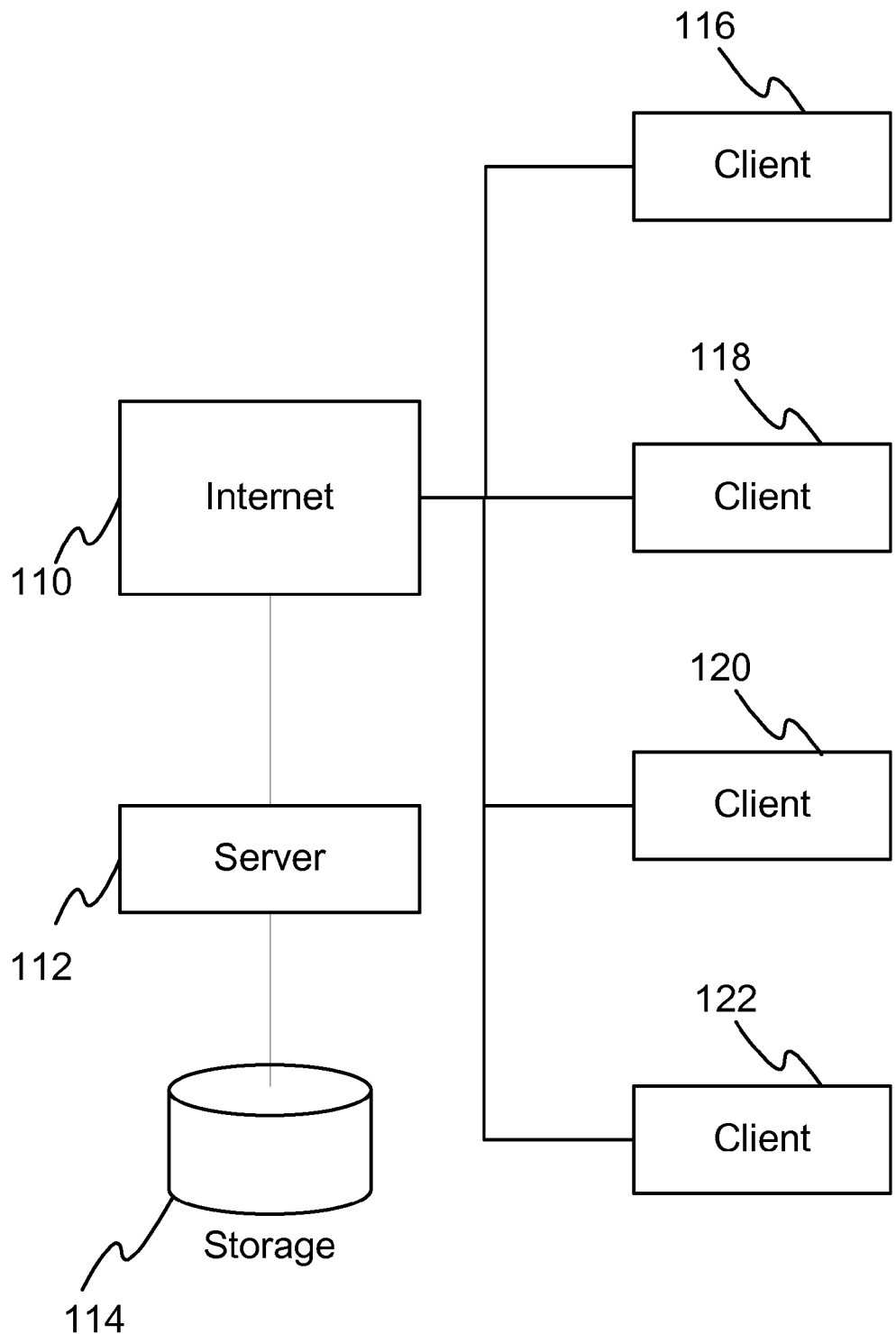
FIG. 1 is a schematic diagram of the instant messaging network environment.

An embodiment of the invention is a method (FIG. 1) for use of instant messaging network environment. In one embodiment, a plurality of users may be connected via an external network such as Internet (110) or other communications network. The users may access the Internet (110) via client devices (116, 118, 120 and 122). The client devices may include, for example, portable communication devices (116, 118, and 120) and/or a personal computer (122). Additionally included in this example is a server (112) that is coupled to a data storage unit (114).

During an instant messaging session, a user may activate instant messaging client software that is stored on the user's client device (116). Activation of the instant messaging client software can facilitate a connection request with the server (112), which may be a dedicated instant messaging server. The server (112) can then authenticate the user via various authentication techniques, including: if the data submitted by the user matches the data stored in data storage (114), the user can be authenticated.

Once the user has been authenticated, the user can send an instant message to any of his or her contacts. Generally speaking, the user can send an Instant message to anyone who has an account with the server (112).

Figure 2:
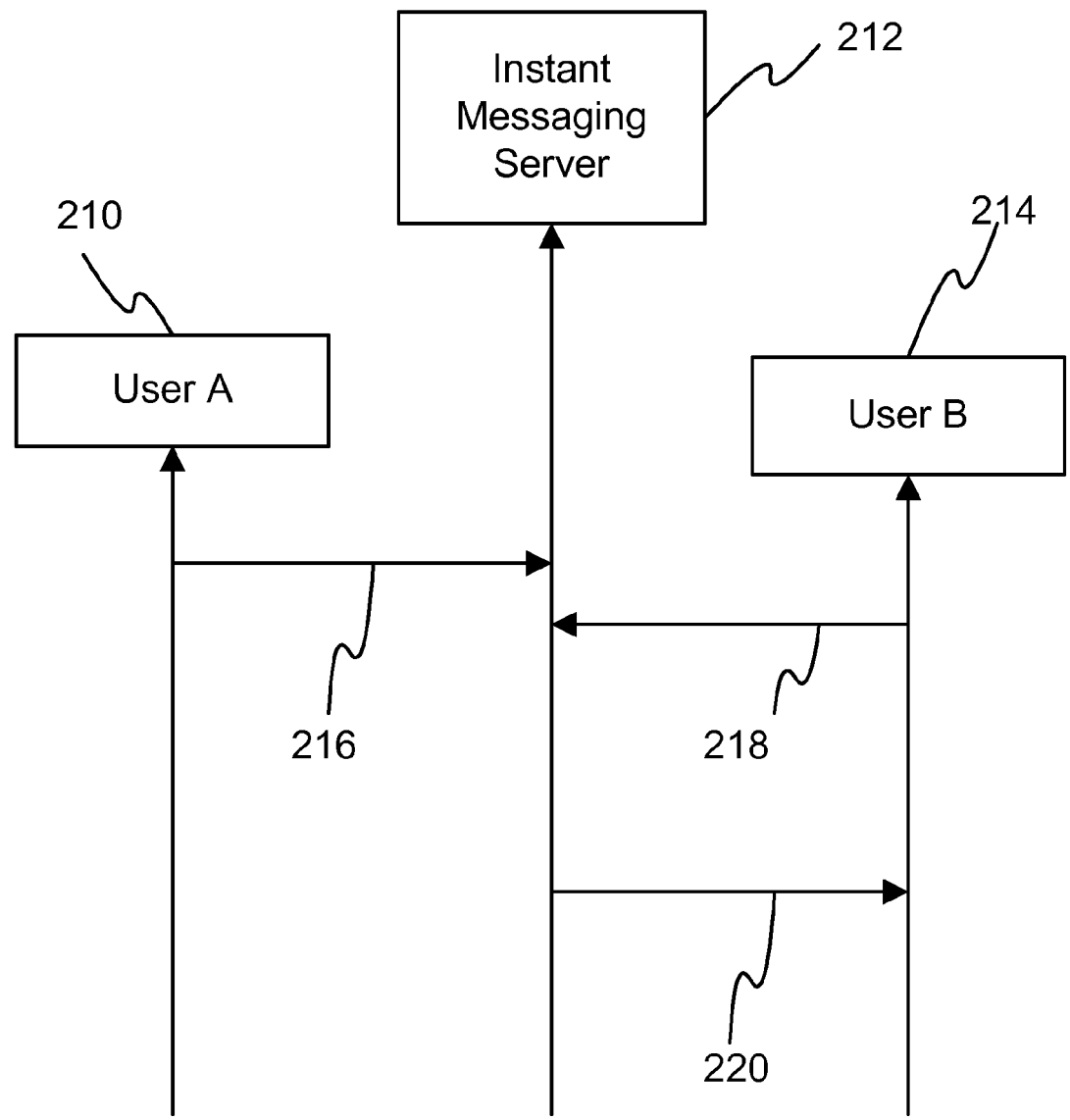
FIG. 2 is a data flow diagram delivering instant messages to the intended.

FIG. 2 is a schematic diagram illustrating an embodiment for a data flow delivering instant messages to the intended. User A (210) opens up a chat window for user B (214) and starts typing the message (in this case, the record will be created at server (212)), but user A does not click on the send button, nor does user A (210) closes the chat window (216). In this case, the invention prompts user B with an alert message after user B (214) attempts to log off or disconnect, based on a configurable maximum wait time (220). If user B (214) does not receive message by the specified time, then either the record will be deleted automatically by the server (212) (server side setting), or user B (214) can logoff without getting prompted, even if the record is still there in the database (218). If the maximum wait time is exceeded and user B (214) logs off, then the message which was there in user A's (210) chat window can still be sent to user B, (214) as an offline message, as in current existing solutions, in order to have user B (214) receive the message, when logging to the system again. One embodiment of the invention is a method for alerting a receiving user of a message in an instant messaging system, the method comprising:
- a sending user composing the message for the receiving user on a sending client; wherein the sending client communicates with the instant messaging system;
- if sending user activates a sending function, then establishing a session between the sending client and the receiving client, and sending the message from the sending client to the receiving client via the instant message system, wherein the composing is done prior to the establishing the session;
- upon the composing the message, creating a record identifying the sending user and a message modification timestamp, and associating the record with the receiving user, wherein the message modification timestamp indicates a latest time the message is modified by the sending user;
- updating the message modification timestamp in the record, if the sending user modifies the message during the composing of the message and prior to the establishing the session;
- removing the record upon the establishing the session, upon the sending user logging off or disconnecting the sending client from the instant message system, or upon the sending user closing the message;
- if the receiving user attempts to logoff or disconnect the receiving client from the instant message system, then querying the record associated with the receiving user; and
- upon the querying the record, if the record is not yet removed, then determining the sending user and the modification timestamp from the record, and alerting the receiving user that the message is pending from the sending user, if the modification timestamp of the record is not older than a current time by a configurable maximum wait time.

A system, apparatus, or device comprising one of the following items is an example of the invention: IM server, alarm, meeting organizer, email server, server, client device, PDA, mobile device, cell phone, storage to store the messages, router, switches, network, communication media, cables, fiber optics, physical layer, buffer, nodes, packet switches, computer monitor, or any display device, applying the method mentioned above, for purpose of invitation, communication, collaboration, social interaction, work, project, or meeting management.

Any variations of the above teaching are also intended to be covered by this patent application.

The invention claimed is:

1. A method for alerting a receiving user of a message in an instant messaging system, said method comprising:
- a sending user composing said message for said receiving user on a sending client;
- wherein said sending client communicates with said instant messaging system;
- if sending user activates a sending function, then establishing a session between said sending client and said receiving client, and sending said message from said sending client to said receiving client via said instant message system;
- wherein said composing is done prior to said establishing said session;
- upon said composing said message, creating a record identifying said sending user and a message modification timestamp, and associating said record with said receiving user;
- wherein said message modification timestamp indicates a latest time said message is modified by said sending user;
- updating said message modification timestamp in said record if said sending user modifies said message during said composing of said message and prior to said establishing said session;
- removing said record upon said establishing said session, upon said sending user logging off or disconnecting said sending client from said instant message system, or upon said sending user closing said message;
- if said receiving user attempts to logoff or disconnect said receiving client from said instant message system, then querying said record associated with said receiving user; and
- upon said querying said record, if said record is not yet removed, then determining said sending user and said modification timestamp from said record, and alerting said receiving user that said message is pending from said sending user if said modification timestamp of said record is not older than a current time by a configurable maximum wait time.

* * * * *